United States Patent [19]

Yamada et al.

[11] 4,439,486

[45] Mar. 27, 1984

[54] MAGNETIC RECORDING MEDIUM

[75] Inventors: Yasuyuki Yamada; Masaaki Fujiyama; Nobuo Tsuji, all of Kanagawa, Japan

[73] Assignee: Fuji Photo Film Co., Ltd., Kanagawa, Japan

[21] Appl. No.: 357,448

[22] Filed: Mar. 12, 1982

[30] Foreign Application Priority Data

Mar. 12, 1981 [JP] Japan ................................. 56-35891

[51] Int. Cl.³ ............................................. G11B 5/70
[52] U.S. Cl. ................... 428/332; 252/62.54; 360/134; 360/135; 360/136; 427/128; 428/336; 428/425.9; 428/694; 428/695; 428/464; 428/900
[58] Field of Search ............... 428/425.9, 900, 694, 428/695, 336, 332, 464; 252/62.54; 427/128; 360/134–136

[56] References Cited

U.S. PATENT DOCUMENTS

| | | | |
|---|---|---|---|
| 4,002,804 | 1/1977 | Akashi | 428/694 |
| 4,323,596 | 4/1982 | Buxbaum et al. | 428/694 |
| 4,363,850 | 12/1982 | Yasui | 428/694 |

FOREIGN PATENT DOCUMENTS 54-29085 9/1979 Japan .

OTHER PUBLICATIONS

*Encycloped. of Polymer Sci. & Tech.,* vol. 3, "Cellulose Nitrate", pp. 307–310, John Wiley & Sons, Inc., 1965.

*Primary Examiner*—Ellis P. Robinson
*Attorney, Agent, or Firm*—Sughrue, Mion, Zinn, Macpeak and Seas

[57] ABSTRACT

A magnetic recording medium having a magnetic layer formed on a nonmagnetic base is disclosed. The magnetic layer comprises ferromagnetic particles having a specific surface area of 30 $m^2/g$ or more. The particles are dispersed in a binder which comprises a thermoplastic polyurethane resin or polyurethane prepolymer and nitrocellulose having an average degree of polymerization of about 50 to 300 and a degree of nitration of 10.7 to 13.0.

14 Claims, No Drawings

MAGNETIC RECORDING MEDIUM

FIELD OF THE INVENTION

The present invention relates to a magnetic recording medium, and more particularly, to a magnetic recording medium containing fine ferromagnetic particles with a specific surface area of at least 30 m²/g and which has a high degree of orientation and wear resistance.

BACKGROUND OF THE INVENTION

Most conventional ferromagnetic particles have a specific surface area of not more than 20 m²/g. However, with the increasing demand for a magnetic recording medium having very high S/N ratio, very fine ferromagnetic particles having a specific surface area of 30 m²/g or more have begun to be used on many occasions. It has been found that as the grain size of the ferromagnetic particles is reduced, the degree of orientation of the particles in the magnetic layer is decreased and the wear resistance of the magnetic layer impaired.

SUMMARY OF THE INVENTION

The present inventors have conducted various studies on the production of a magnetic recording medium containing very fine ferromagnetic particles with a specific surface area of at least 30 m²/g and which has a high degree of orientation and wear resistance. As a result of their studies they have found that by using the combination of the binder components described herein, a magnetic layer having a high degree of orientation and wear resistance can be produced.

Therefore, one object of the present invention is to provide a magnetic recording medium containing very fine ferromagnetic particles with a specific surface area of at least 30 m²/g and which has a high degree of orientation and wear resistance.

This object of the present invention can be achieved by a magnetic recording medium having a magnetic layer formed on a nonmagnetic base, said magnetic layer comprising ferromagnetic particles having a specific surface area of 30 m²/g or more that are dispersed in a binder which comprises a thermoplastic polyurethane resin or polyurethane prepolymer and a nitrocellulose having an average degree of polymerization of about 50 to 300 and a degree of nitration of 10.7 to 13.0. The magnetic recording medium of the present invention can be given higher heat resistance and wear resistance by incorporating a polyisocyanate compound in the binder to form a three-dimensional network structure in the magnetic layer.

DETAILED DESCRIPTION OF THE INVENTION

The thermoplastic polyurethane resin that can be used in the present invention is the polyester polyurethane or polyether polyurethane produced by reacting a polyester polyol or polyether polyol with a diisocyanate compound. The polyester polyol is obtained by reacting an organic dibasic acid such as phthalic acid, adipic acid, dimerized linoleic acid and maliec acid (preferably adipic acid and phthalic acid, more preferably adipic acid) with a glycol such as ethylene glycol, propylene glycol, butylene glycol and diethylene glycol (more preferably propylene glycol and butylene glycol) or a polyhydric alcohol such as trimethylolpropane, hexanetriol, glycerin, trimethylolethane and pentaerythritol. Preferred examples of the polyether polyol are polyoxypropylene glycol, poly(oxypropylene)poly(oxyethylene)glycol, poly(oxybutylene)glycol, poly(oxytetramethylene)glycol, poly(oxypropylene)triol, poly(oxypropylene)poly(oxyethylene)triol and poly(oxypropylene)poly(oxyethylene)poly(oxypropylene)triol, with poly(oxybutylene)glycol being particularly preferred. These polyether polyols are obtained by ring-openings polymerization of alkylene oxides. Preferred diisocyanate compounds are tolylene diisocyanate, 4,4'-diphenylmethane diisocyanate, hexamethylene diisocyanate and methaxylylene diisocyanate, with 4,4'-diphenylmethane diisocyanate and hexamethylene diisocyanate being particularly preferred. A thermoplastic polyurethane resin having higher modules and which is more effective as a binder can be produced by incorporating less than 10 mol%, preferably less than 5 mol%, of the above named polyhydric alcohols in the system wherein the polyester polyol or polyether polyol is reacted with a diisocyanate compound, the percent being based on the overall reaction system. The resulting thermoplastic polyester polyurethane or polyether polyurethane preferably has a number average molecular weight of from about 5,000 to 100,000, more preferably from about 9,000 to 70,000.

Commercially available thermoplastic polyurethane resin include Morthane (e.g., CA-250 HV, CA-275 and CA-300) of Morton Chemical Co.; Nipporan (e.g., N-2301, N-2302, N-2304, N-3022, N-3109, N-3913, N-3922, N-5032 and N-5033) and Paraprene (P-225) of Nippon Polyurethane Industry Co., Ltd.; and Crisvon (e.g. 5116, 6109, 6208, 6408, 6868, 7209, 7309, 7319 and 8166) of Dainippon Ink and Chemical Inc.

The polyurethane prepolymer to be used in the present invention is a polyether prepolymer having a terminal-NCO group that is derived from a polyisocyanate and a polyether glycol. The prepolymer preferably has a number average molecular weight of from about 1,000 to 10,000, more preferably from about 2,000 to 9,000. Suitable polyether glycols include (1) polyalkylene ether glycols (e.g. polytetraethylene ether glycol, and polypropylene ether glycol), (2) polyalkylenearylene ether thioether glycol, (3) polyalkylene ether thioether glycol, and (4) polyalkylenearylene ether glycol. Suitable polyisocyanates are those having aromatic, aliphatic or alicyclic compounds, and preferred exaples are 2,4-tolylene diisocyanate, m-phenylenediisocyanate, 4,4-biphenylene diisocyanate, 1,4-cyclohexylene diisocyanate, 1,5-tetrahydronaphthalene diisocyanate, 1,6-hexamethylene diisocyanate, 4-chloro-1,3-phenylene diisocyanate and 1,5-naphthalene diisocyanate.

Commercially available polyurethane prepolymers include Takenate (e.g. L-1007, L-1128, L-1150, L-1151, L-1153, L-1155, L-1156, L-1307, L-2710, L-2760 and L-6001) of Takeda Chemical Industries, Ltd.; Adiprene L of E. I. Du Pont de Nemours & Co.; High-prene (U-30, U-41Y, U-42, U-51, EX-116, L-100, L-167, L-213 and L-320) of Mitsui-Nisso Urethane Co., Ltd.

The nitrocellulose used in the present invention preferably has an average degree of polymerization from about 50 to 300, more preferably from about 80 to 200, and a degree of nitration of from 10.7 to 13.0, more preferably from 11.5 to 12.2. If the degree of polymerization is too low, the coating solution (magnetic paint) does not form a strong and durable film. If the degree of polymerization is too high, it produces a very viscous magnetic paint that is difficult to handle. If the degree of nitration is too high, the magnetic particles are not easily dispersed and the resulting magnetic layer does not have great resistance to wear. If the degree of nitration is too low, the nitrocellulose becomes less miscible with the polyurethane resin.

The polyisocyanate compound used in the present invention is an aliphatic, alicyclic or aromatic di-, tri- or tetraisocyanate having at least two isocyanato groups. Specific examples include isocyanate such as ethane diisocyanate, butane-$\omega,\omega'$-diisocyanate, hexane-$\omega,\omega'$-diisocyanate, 2,2-dimethylpentane, $\omega,\omega'$-diisocyanate, 2,2,4-trimethylpentane-$\omega,\omega'$-diisocyanate, decane-$\omega,\omega'$-diisocyanate, $\omega,\omega'$-diisocyanato-1,3-dimethylbenzole, $\omega,\omega'$-diisocyanato-1,2-dimethylcyclohexane, $\omega,\omega'$-diisocyanato-1,4-diethylbenzole, $\omega,\omega'$-diisocyanato-1,5-dimethylnaphthalene, $\omega,\omega'$-diisocyanato-n-propyl-biphenyl, 1,3-phenylene diisocyanate, 1-methylbenzole, 2,4-diisocyanate, 1,3-dimethylbenzole-2,6-diisocyanate, naphthalene-1,4-diisocyanate, 1,1'-dinaphthyl-2,2'-diisocyanate, biphenyl-2,4'-diisocyanate, 3,3'-dimethylbiphenyl-4,4'-diisocyanate, diphenylmethane-4,4'-diisocyanate, 2,2'-dimethyldiphenylmethane-4,4'-diisocyanate, 3,3'-dimethoxydiphenylmethane-4,4'-diisocyanate, 4,4'-diethoxydiphenylmethane-4,4'-diisocyanate, 1-methylbenzole-2,4,6-triisocyanate, 1,3,5-trimethylbenzole-2,4,6-trisocyanate, diphenylmethane-2,4,4'-triisocyanate, triphenylmethane-4,4'-4''-triisocyanate, tolylene diisocyanate, and 1,5-naphthylene diisocyanate, dimers or trimers of these isocyanates; and adducts of these isocyanates with diols or triols, such as the adduct of trimethylpropane and tolylene diisocyanate or hexamethylene diisocyanate.

The ferromagnetic particles used in the present invention have a specific surface area of 30 m$^2$/g or more as measured by the BET method. Suitable ferromagnetic particles are fine particles of ferromagnetic iron oxide, ferromagnetic chromium dioxide and ferromagnetic alloys. The suitable ferromagnetic iron oxide is represented by the general formula: FeO$_x$ (wherein $1.33 \leq X \leq 1.50$), i.e. maghemite ($\gamma$-Fe$_2$O$_3$ wherein x=1.50), magnetite (Fe$_3$O$_4$ wherein x=1.33) and Berthollide compounds thereof (FeO$_x$ wherein $1.33 < x < 1.50$). The value of x in the formula FeO$_x$ is determined by the following formula:

$$x = \frac{1}{200} \times \left\{ 2 \times \begin{pmatrix} \text{atomic \% of} \\ \text{ferrous iron} \end{pmatrix} + 3 \times \begin{pmatrix} \text{atomic \% of} \\ \text{ferric iron} \end{pmatrix} \right\}$$

These ferromagnetic iron oxides may contain a divalent metal such as Cr, Mn, Co, Ni, Cu or Zn which is generally contained in an amount of from 0 to 10 atomic % on the basis of the iron oxide. The suitable ferromagnetic chromium dioxide is CrO$_2$ which may optionally contain 0 to 20 wt% of a metal such as Na, K, Ti, V, Mn, Fe, Co, Ni, Tc, Ru, Sn, Ce or Pb, a semiconductor such as P, Sb or Te, or an oxide of these metals. The ferromagnetic alloy has a metal content of at least 75 wt%. At least 80 wt% of the metal content consists of at least one ferromagnetic metal (i.e. Fe, Co, Ni, Fe-Co, Fe-Ni, Co-Ni or Co-Ni-Fe), and not more than 20 wt%, preferably 0.5 to 5 wt%, of the metal content is selected from Al, Si, S, Sc, Ti, V, Cr, Mn, Cu, Zn, Y, Mo, Rh, Pd, Ag, Sn, Sb, Te, Ba, Ta, W, Re, Au, Hy, Pb, Bi, La, Ce, Pr, Nd, B and P. The ferromagnetic alloy may further contain a small amount of water, hydroxide or oxide.

The weight ratio of the nitrocellulose to the thermoplastic polyurethane resin or polyurethane propolymer is generally in the range of from 1:9 to 1:1, preferably from 2:8 to 3:7. If a polyisocyanate compound is used, it is generally blended, in an amount of from about 5 to 50 parts, preferably from about 10 to 30 parts, with 100 parts by weight of the mixture of nitrocellulose and thermoplastic polyurethane resin or polyurethane propolymer. The binder mixture according to the present invention is generally used in an amount of from 17 to 50 parts by weight, preferably from 23 to 30 parts by weight, for 100 parts by weight of the ferromagnetic particles.

According to the present invention, the ferromagnetic particles as dispersed in the binder mixture are blended with an organic solvent and other conventional additives to form a coating solution (magnetic paint) that is applied onto a nonmagnetic base. The resulting web is passed through a magnetic field to orient the magnetic particles, and subsequently dried. Suitable additives are described hereinafter and include a dispersant, lubricant, abrasive and antistat. The resulting magnetic layer preferably has a dry thickness of from 1 to 18$\mu$, and for a magnetic digital recording/reproducing medium having a protective layer, the allowable thickness is increased about 30$\mu$. If two magnetic layers are formed, the sum of the two layers is preferably within the defined range. The specific thickness of the magnetic layer is determined by the use, shape (e.g. film, tape, sheet, disc, card or drum) and specifications of the magnetic recording medium.

The nonmagnetic base may be made of polyesters such as polyethylene terephthalate and polyethylene-2,6-naphthalate; polyolefins such as polyethylene and polypropylene; cellulose derivatives such as cellulose triacetate cellulose diacetate, cellulose acetate butyrate, and cellulose acetate propionate; vinyl resins such as polyvinyl chloride and polyvinylidene chloride; and polycarbonate, polyimide and polyamideimide; nonmagnetic metals such as aluminum, copper, tin, zinc or nonmagnetic alloys containing the same; ceramics such as glass, earthenware and porcelain; paper, baryta and paper coated or laminated with $\alpha$-olefins having 2 to 10 carbon atoms, such as polyethylene, polypropylene and ethylene-butene copolymer. These nonmagnetic bases may be transparent or opaque depending on the use. The nonmagnetic base may be in any form such as film, tape, sheet, disc, card or drum, and it may be made of various materials according to its form. These nonmagnetic bases are from about 2 to 50$\mu$, preferably from 3 to 25$\mu$ thick, when they are in the form of tape or sheet, from about 20 to 90$\mu$ thick when they are a flexible (floppy) disc sheet, and from about 0.5 to 10 mm thick when they are in a disc or card form. They may be in a cylindrical drum form. The specific configuration of the base is determined by the type of recorder in which the magnetic recording medium is used.

For details of the method of preparing the magnetic paint to be used in the formation of the magnetic layer of coated type, see Japanese Patent Publications Nos. 15/60, 26794/64, 186/68, 28043/72, 28045/72, 28046/72, 28048/72, 31445/72, 11162/73, 21331/73 and 33683/73; Russian Patent No. 308,033; U.S. Pat. Nos. 2,581,414, 2,855,156, 3,240,621, 3,526,598, 3,728,262, 3,790,407 and 3,836,393 incorporated by reference. The magnetic paint compositions described in these references contain ferromagnetic particles, binder and solvent as the principal components, and they may contain optional additives such as a dispersant, lubricant, abrasive and antistat.

Suitable dispersants include aliphatic acids having 12 to 18 carbon atoms ($R_1COOH$ wherein $R_1$ is an alkyl or alkenyl group having 11 to 17 carbon atoms) such as caprylic acid, capric acid, lauric acid, myristic acid, palmitic acid, stearic acid, oleic acid, elaidic acid, linolic acid, linolenic acid and stearoic acid; metal soaps made of alkali metal (e.g., Li, Na, or K) or alkaline earth metal (e.g. Mg, Ca or Ba) salts of these aliphatic acids; fluorine-containing compounds of these aliphatic acids; amides of these aliphatic acids, polyalkyleneoxidealkyl phosphate ester, lecithin, trialkylpolyolefinoxy quaternary ammonium salt (wherein the alkyl has 1 to 5 carbon atoms, and examples of the olefin are ethylene and propylene). Higher alcohols having 12 or more carbon atoms, and sulfate esters can also be used as the dispersants.

The dispersants mentioned above can also be used as a lubricant. Other suitable lubricants are silicone oils such as dialkylpolysiloxane (the alkyl having 1 to 5 carbon atoms), dialkoxypolysiloxane (the alkoxy having 1 to 4 carbon atoms), monoalkylmonoalkoxypolysiloxane (the alkyl having 1 to 5 carbon atoms, the alkoxy having 1 to 4 carbon atoms), phenylpolysiloxane, and fluoroalkylpolysiloxane (the alkyl having 1 to 5 carbon atoms); fine particles of an electrically conductive material such as graphite; fine particles of an inorganic material such as molybdenum disulfide and tungsten disulfide; fine particles of plastics such as polyethylene, polypropylene, polyethylene/vinyl chloride copolymer and polytetrafluoroethylene; α-olefin polymers; unsaturated aliphatic hydrocarbons that are liquid at ordinary temperatures (n-olefin having a double bond attached to a terminal carbon atom; about 20 carbon atoms); aliphatic acid esters of a monobasic aliphatic acid having 12 to 20 carbon atoms and a monovalent alcohol having 3 to 12 carbon atoms, and fluorocarbons.

Suitable abrasives are fused alumina, silicon carbide, chromium oxide ($Cr_2O_3$), corundum, artificial corundum, diamond, artificial diamond, garnet, and emery (main components: corundum and magnetite).

Suitable antistats are fine particles of an electrically conductive material such as carbon black, or carbon black graft polymer; a natural surfactant such as saponin; and alkylene oxide, glycerin or glycidol nonionic surfactant; a cationic surfactant such as higher alkylamines, quaternary ammonium salts, heterocyclic compounds (e.g. pyridine), and phosphonium or sulfoniums; and anionic surfactant containing an acidic group such as carboxylic acid group, sulfonic acid group, phosphoric acid group, sulfate ester group or phosphate ester group; and an amphoteric surfactant such as amino acids, aminosulfonic acids, and sulfate or phosphate esters of aminoalcohol.

Suitable organic solvents for the coating solution include ketones such as acetone, methyl ethyl ketone, methyl isobutyl ketone and cyclohexanone; esters such as methyl acetate, ethyl acetate, butyl acetate, ethyl lactate, and glycol acetate monoethyl ether; tars (aromatic hydrocarbons) such as benzene, toluene and xylene; chlorinated hydrocarbons such as methylene chloride, ethylene chloride, carbon tetrachloride, chloroform, ethylene chlorohydrin and dichlorobenzene.

The ferromagnetic particles, binder, dispersant, lubricant, abrasive, antistat and solvent are blended to form magnetic paint. The magnetic paint is prepared by charging a mixer with the magnetic particles and all other ingredients simultaneously or sequentially. In one method, the magnetic particles are added to a solvent containing a dispersant, and the mixture is stirred for a given period to form magnetic paint. Various mixers may be used to achieve thorough mixing of the magnetic paint composition. Examples are a two-roll mill, three-roll mill, ball mill pebble mill, trommel, sand grinder, Szegvari attritor, high-speed impeller disperser, high-speed stone mill, high-speed impact mill, disperser, kneader, high-speed mixer, homogenizer and ultrasonic disperser. For details of the kneading and dispersing technique, see T. C. Patton, "Paint Flow and Pigment Dispersion", John Wiley & Sons, 1964, as well as U.S. Pat. Nos. 2,581,414 and 2,855,156 incorporated by reference.

A magnetic coating is formed from the magnetic paint on a base by air doctor coating, blade coating, air knife coating, squeeze coating, impregnate coating, reverse roll coating, transfer roll coating, gravure coating, kiss coating, cast coating, spray coating and spin coating. For details of these other coating techniques, see "Coating Kogaku (Coating Engineering)", published by Asakura Shoten, Mar. 20, 1971, pp. 253–277.

A "dual" magnetic recording medium can be produced by forming two magnetic layers through the steps of applying the magnetic paint onto the nonmagnetic base and drying the same according to any of the methods described above. Two magnetic layers may also be formed by the method of simultaneous multilayer application described in British Pat. Nos. 1,417,442 and 1,417,765.

The magnetic layer thus formed on the base is dried after it is passed in a magnetic field to orient the magnetic particles. If necessary, the surface of the magnetic layer may be smoothed or it is cut into a desired shape to produce the magnetic recording medium of the present invention. The present inventors have found that a magnetic recording medium having a very smooth surface and high wear resistance can be produced by passing the magnetic layer through a smoothing step (e.g. smoothing before drying or calendering after drying). The magnetic particles are optionally oriented in an A.C. or D.C. magnetic field having a magnetizing force of about 500 to 3,000 Oe. The direction of orientation is determined by the use of the magnetic medium. For audio tape, small-size video tape and memory tape, the direction is parallel to the tape length, whereas for broadcasting video tape, the direction of orientation is 30 to 90 degrees off the tape length. Other methods of orientation of the magnetic particles are described in the following references: U.S. Pat. Nos. 1,949,840, 2,796,359, 3,001,891, 3,172,776, 3,416,949, 3,473,960, 3,681,138 incorporated by reference; Japanese Patent Publication Nos. 3427/57, 28368/64, 23624/65, 23625/65, 13181/66, 13043/73 and 39722/73. If the magnetic layer is composed of two sublayers, the magnetic particles in the upper magnetic layer may be oriented in a different direction than those in the lower magnetic layer as described in Japanese Patent Application (OPI) No. 79905/77, U.S. Pat. No. 3,775,178 incorporated by reference and German Patent Application (DT-AS) No. 1,190,985.

The oriented magnetic layer is subsequently dried at a temperature of from about 50° to 120° C., more preferably from 70° to 100° C., most preferably from 80° to 90° C., for a period of from about 30 seconds to 10 minutes, preferably from 1 to 5 minutes, with air supplied at a flow rate of from 1 to 5 kl/m², preferably from 2 to 3 kl/m².

The surface of the magnetic layer before drying can be smoothed by a magnet smoother, smoothening coil, smoothening blade, smoothening blanket or any other suitable method. For details of these methods, see Japanese Patent Publication No. 38802/72, British Pat. No. 1,191,424, Japanese Patent Publication No. 11336/73, Japanese Patent Application (OPI) Nos. 53631/74, 112005/75, 77303/76, 151005/77, 13404/78, etc.

After the drying, the web may be calendered. Preferably, it is supercalendered by passing between a metal roll and cotton roll or synthetic resin (e.g. nylon or polyurethane) roll, or between two metal rolls. Preferably, the nip pressure is from about 25 to 50 kg/cm, and the roll temperature is from about 35° to 150° C., and the tape transport speed is from 5 to 200 m/min. If the roll temperature and nip pressure exceed their respective upper limits, both the magnetic layer and the nonmagnetic base are adversely affected. If the tape transport speed is less than about 5 m/min, the surface of the magnetic layer cannot be smoothed adequately, and if the speed is greater than about 200 m/min, the web handling becomes difficult. For more information on the smoothing treatment, see U.S. Pat. Nos. 2,688,567, 2,998,325 and 3,783,023 incorporated by reference; German Patent Application (OLS) No. 2,405,222; Japanese Patent Application (OPI) Nos. 53631/74, 10337/75, 99506/75, 92606/76, 10204/76 and 103404/76; and Japanese Patent Publication No. 17404/77.

The back surface (the surface opposite the side provided with the magnetic coating) of the base may be provided with a back coating for various purposes, e.g. prevention of static buildup, transfer, and wow flutter, as well as for improvement of the strength of the magnetic recording medium and the matting of the back surface.

The back coating is formed on the back surface of the base by applying a formulation containing at least one additive selected from among the above described lubricant, abrasive and antistat or the like that is dispersed in a known binder for magnetic recording media and a known coating solvent optionally in the presence of a dispersant to achieve uniform dispersion of the additives. The magnetic layer is formed on the base before the back coating or vice versa. Additives preferably used in the back coating are carbon black, graphite, talc, $Cr_2O_3$, $\alpha$-$Fe_2O_3$ (red oxide or hematite) and silicone oil. Preferred binders are thermosetting resins or reaction resins. Inorganic additives are used in an amount of from about 30 to 85 wt%, preferably from 40 to 80 wt%, on the basis of the total content of the solids in the back coating, and organic additives are used in an amount of from about 0.1 to 30 wt%, preferably from 0.2 to 20 wt%. The back coating has a dry thickness in the range of from about 0.5 to 5.0μ, and the specific value can be determined depending upon the total thickness of the magnetic recording medium, its use and shape.

The magnetic recording medium of the present invention described above has a very high degree of orientation and wear resistance, as well as high S/N ratio.

The present invention is now described in greater detail by reference to the following examples and comparative examples which are given here for illustrative purposes only and are by no means intended to limit its scope. In the examples and comparative examples, all parts are by weight.

EXAMPLE 1

A magnetic coating solution having the composition indicated below was prepared with a ball mill and sand mill.

| | | |
|---|---|---|
| (1) Magnetic Co—$\gamma$-$Fe_2O_3$ particles (specific surface area: 38 m²/g, Hc: 650 Oe) | 300 | parts |
| (2) Nitrocellulose (av. deg. of polymerization: 80, deg. of nitration: 12.2) | 35 | parts |
| (3) Thermoplastic polyurethane resin (reaction product of butanediol, adipic acid and diphenylmethane diisocyanate (MDI), n.av.m.w. = 3.2 × 10⁴) | 35 | parts |
| (4) Carbon black (electrically conductive carbon black particles with av. size of 30 mμ) | 15 | parts |
| (5) Abrasive ($Cr_2O_3$, grain size = 0.2μ) | 3 | parts |
| (6) Myristic acid | 3 | parts |
| (7) Butyl stearate | 1.5 | parts |
| (8) Methyl ethyl ketone/cyclohexanone mixture (wt. ratio = 6:4) | 800 | parts |

The paint was applied to a polyethylene terephthalate base 15μ thick to form a magnetic layer in a dry thickness of 5μ. While the coating was still wet, the web was passed in a magnetic field to orient the magnetic particles, and dried. The dried web was super-calendered to provide a smooth magnetic layer. The web was then slit into a magnetic tape sample ½ inch wide, which was refered to as Sample No. 1. Its properties are indicated in Table 1.

EXAMPLE 2

Magnetic tape sample No. 2 was prepared as in Example 1 except that the components (1), (2) and (3) were respectively replaced by 300 parts of Co-$\gamma$-$Fe_2O_3$ particles (specific surface area; 33 m²/g, Hc: 640 Oe), 35 parts of nitrocellulose having an average degree of polymerization of 110 and a degree of nitration of 11.2, and 35 parts of a thermoplastic polyurethane resin which was a reaction product of neopentyl glycol, butanediol, adipic acid and MDI and which had a number average molecular weight of 3×10⁴. The properties of Sample No. 2 are set forth in Table 1.

EXAMPLE 3

Magnetic tape sample No. 3 was prepared as in Example 1 except that the components (1) to (3) were respectively replaced by 300 parts of Co-$\gamma$-$Fe_2O_3$ particles (specific surface area: 40 m²/g, Hc: 630 Oe), 35 parts of nitrocellulose having an average degree of polymerization of 120 and a degree of nitration of 10.7, and 35 parts of a thermoplastic polyurethane resin which was a reaction product of neopentyl glycol, butanediol, adipic acid and MDI and which had a number average molecular weight of 6×10⁴. The properties of Sample No. 3 are shown in Table 1.

EXAMPLE 4

Magnetic tape sample No. 4 was prepared as in Example 3 except that the component (6) was replaced by 1.0 part of silicone oil and that 12 parts of "Collonate L" of Nippon Polyurethane Industry Co., Ltd. (Collonate L is the trade name for an adduct of 1 mol of trimethylolpropane and 3 mols of tolylene diisocyanate) was added as a polyisocyanate compound. The properties of Sample No. 4 are shown in Table 1.

EXAMPLE 5

Magnetic tape sample No. 5 was prepared as in Example 1 except that the component (3) was replaced by 35 parts of a polyurethane prepolymer (made of polytetramethylene ether glycol and tolylene diisocyanate, having a terminal-NCO group and a number average molecular weight of 2,000). The properties of the Sample No. 5 are listed in Table 1.

EXAMPLE 6

Magnetic tape sample No. 6 was prepared as in Example 1 except that the magnetic coating solution also contained 12 parts of "Collonate L" of Nippon Polyurethane Industry Co., Ltd. as a polyisocyanate compound. The properties of the sample are shown in Table 1.

COMPARATIVE EXAMPLE 1

A comparative magnetic tape sample was prepared as in Example 1 except that the component (2) was replaced by a vinyl chloride/vinyl acetate copolymer (VAGH of Union Carbide Corporation).

COMPARATIVE EXAMPLE 2

A second comparative magnetic tape sample was prepared as in Example 1 except that the component (3) was replaced by an epoxy resin ("Epikote 1001" of Shell International Chemicals Corp.)

COMPARATIVE EXAMPLE 3

A third comparative magnetic tape sample was prepared as in Example 1 except that the component (1) was replaced by Co-$\gamma$-$Fe_2O_3$ particles (specific surface area: 21 $m^2$/g, Hc: 650 Oe).

The properties of the three comparative samples are indicated in Table 1.

TABLE 1

| Sample No. | Chroma S/N*[1] (dB) | Wear resistance*[2] (in still frame test) |
|---|---|---|
| 1 | 0 | 30 min. or more |
| 2 | −0.1 | " |
| 3 | +0.5 | " |
| 4 | +0.5 | " |
| 5 | +0.4 | " |
| 6 | +0.2 | " |
| Comp. Sample 1 | −0.2 | less than 1 min. |
| Comp. Sample 2 | −0.1 | less than 1 min. |
| Comp. Example 3 | −2.3 | 30 min. or more |

*[1]Values relative to the S/N of Sample No. 1.
*[2]The sample tape was threaded in a VHS cassette-half and run on a video tape recorder, Model NV-8310 of Matsushita Electric Industrial Co., Ltd. in a still mode. The time for the reproduced output to be reduced to substantially zero as a result of tape abrasion was measured.

The above data shows that a magnetic recording medium having high chroma S/N ratio and wear resistance can be produced by dispersing magnetic particles having a specific surface area of 30 $m^2$/g or more in a binder containing the nitrocellulose and the thermoplastic polyurethane resin or polyurethane prepolymer defined by the present invention. Sample Nos. 1 to 6 are good in both chroma S/N ratio and wear resistance. Comparative Sample Nos. 1 and 2 that use the same magnetic particles but which use resins different from those used in Sample Nos. 1 to 6 have smaller wear resistance although they have substantially the same chroma S/N ratio. Comparative Sample No. 3 that uses magnetic particles having a smaller specific surface area (21 $m^2$/g) has satisfactorily great wear resistance but its chroma S/N ratio is not as high as that of Sample Nos. 1 to 6. Though it is not desired to be bound, it is believed that the nitrocellulose is effectively adsorbed on the ferromagnetic particles having large specific surface area and has excellent compativility with the thermoplastic polyurethane resin or polyurethane prepolymer, whereby an uniform magnetic layer can be formed, providing a magnetic recording medium having high S/N ratio and excellent wear resistance.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising:
    a nonmagnetic support base; and
    a magnetic layer formed on a surface of the base, the magnetic layer consisting essentially of:
    ferromagnetic particles having a specific surface area of 30 $m^2$/g or more; and
    a binder consisting essentially of a nitrocellulose having an average degree of polymerization of about 50 to 300 and a degree of nitration of 10.7 to 13.0, a polymer selected from the group consisting of a thermoplastic polyurethane resin and a polyurethane prepolymer, and a polyisocyanate compound.

2. A magnetic recording medium as claimed in claim 1, wherein said polymer is a thermoplastic polyurethane resin having a number average molecular weight of from about 5,000 to 100,000.

3. A magnetic recording medium as claimed in claim 2, wherein said number average molecular weight is from about 9,000 to 70,000.

4. A magnetic recording medium as claimed in claim 1, wherein said polymer is a polyurethane prepolymer having a number average molecular weight of from about 1,000 to 10,000.

5. A magnetic recording medium as claimed in claim 4, wherein said number average molecular weight is from about 2,000 to 9,000.

6. A magnetic recording medium as claimed in claim 1, wherein said nitrocellulose has an average degree of polymerization of from about 80 to 200 and a degree of nitration of from 11.5 to 12.2.

7. A magnetic recording medium as claimed in claim 1, wherein the weight ratio of said nitrocellulose to said polymer is in the range of 1:9 to 1:1.

8. A magnetic recording medium as claimed in claim 7, wherein said weight ratio is from 2:8 to 3:7.

9. A magnetic recording medium as claimed in claim 1, wherein said polyisocyanate compound is contained in an amount of 5 to 50 parts by weight per 100 parts by weight of the mixture of said nitrocellulose and said polymer.

10. A magnetic recording medium as claimed in claim 9, wherein said polyisocyanate compound is contained in an amount of 10 to 30 parts by weight per 100 parts by weight of the mixture of said nitrocellulose and said polymer.

11. A magnetic recording medium as claimed in claim 1, wherein said binder is contained in an amount of 17 to 50 parts by weight per 100 parts by weight of the ferromagnetic particles.

12. A magnetic recording medium as claimed in claim 1, wherein said binder is contained in an amount of 23 to 30 parts by weight per 100 parts by weight of the ferromagnetic particles.

13. A magnetic recording as claimed in claim 1, wherein the magnetic layer has a dry thickness of from 1 to 18μ.

14. A magnetic recording medium as claimed in claim 1, wherein said binder consists of a nitrocellulose having an average degree of polymerization of about 50 to 300 and a degree of nitration of 10.7 to 13.0, a polymer selected from the group consisting of a thermoplastic polyurethane resin and a polyurethane prepolymer, and a polyisocyanate compound.

* * * * *